Figure 1:
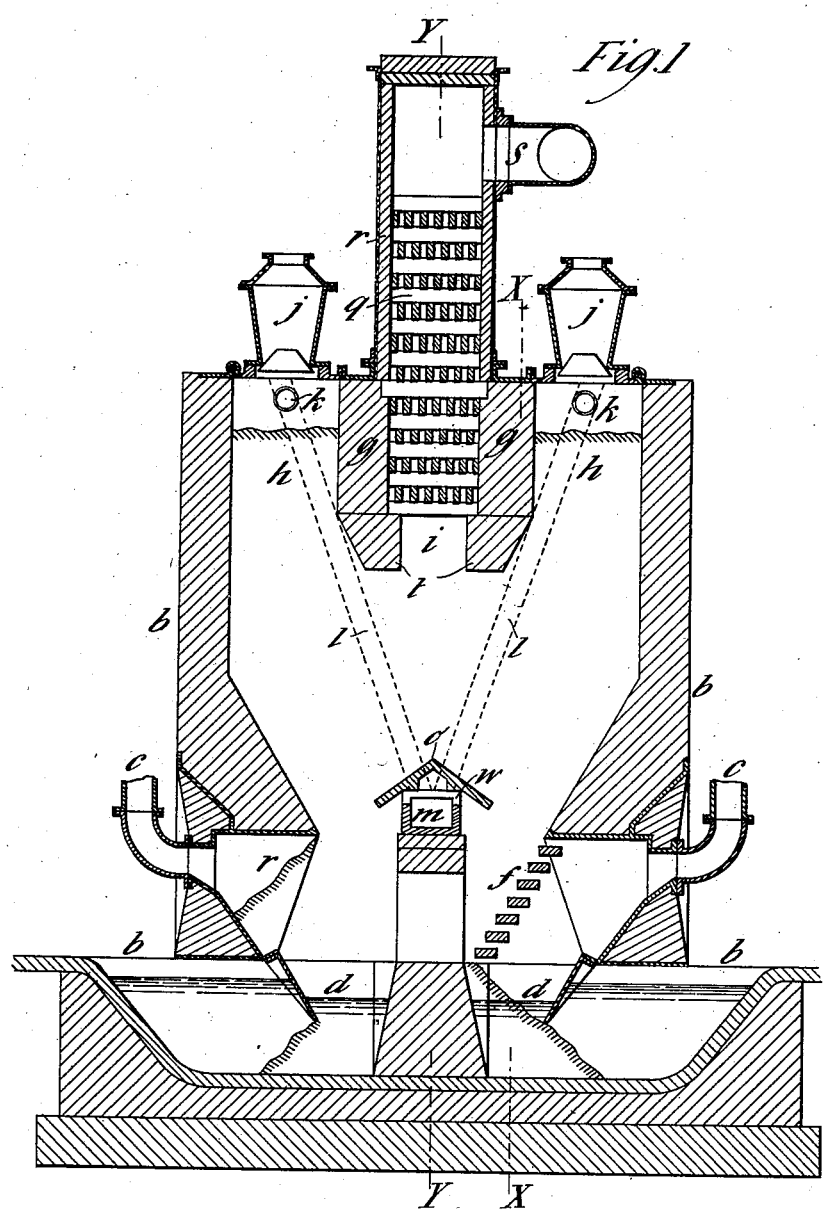

No. 744,218. PATENTED NOV. 17, 1903.
L. MOND.
PROCESS OF MAKING GAS.
APPLICATION FILED FEB. 27, 1902.
NO MODEL. 2 SHEETS—SHEET 1.

Witnesses: Inventor
Ludwig Mond
By
James L. Norris
Atty.

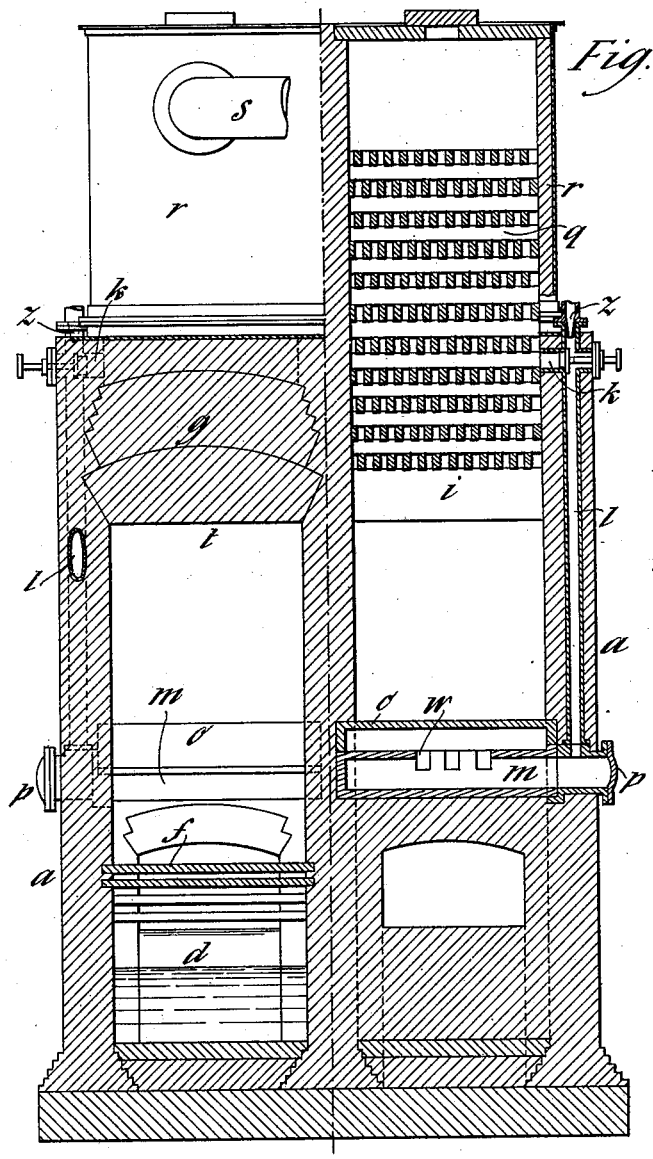

No. 744,218. Patented November 17, 1903.

UNITED STATES PATENT OFFICE.

LUDWIG MOND, OF LONDON, ENGLAND.

PROCESS OF MAKING GAS.

SPECIFICATION forming part of Letters Patent No. 744,218, dated November 17, 1903.

Application filed February 27, 1902. Serial No. 95,976. (No model.)

*To all whom it may concern:*

Be it known that I, LUDWIG MOND, a citizen of England, residing at The Poplars, 20 Avenue road, Regents Park, London, England, have invented certain new and useful Improvements in the Method of Operating Gas-Producers for Obtaining Combustible Gases and Ammonia, (for which I have applied for patents in Great Britain, dated August 2, 1901, No. 15,667, and dated August 3, No. 15,750, and in Germany, dated August 9, 1901, Serial No. 20,143 VI/26ª,) of which the following is a specification.

This invention relates to a method of operating gas-producers for obtaining combustible gases and ammonia from lignites, peat, wood, and other combustibles containing a considerable amount of moisture or combined water and also from bituminous coal containing a large amount of volatile constituents. With gas-producers for these purposes there are three essential conditions that require to be fulfilled in order to insure the practical economical working thereof. First, it is essential that the largest possible proportion of the gases generated shall be of a permanent—i. e., non-condensable—nature; secondly, it is important that the large amount of steam given off in drying and distilling the fuel should be utilized in the production of gas and ammonia from the fuel, and, thirdly, that the valuable ammonia-vapor generated should be collected with as little loss as possible.

All gas-producers heretofore employed leave much to be desired in the fulfilment of any of these conditions. They are generally either so arranged that the whole of the volatile constituents and aqueous vapor given off by distillation from the upper part of the charge in the producer pass away with the ordinary producer-gas from the lower part of the charge, resulting in the production of a large proportion of non-permanent gases and tarry vapors that are subsequently condensed and cause considerable loss, as also obstruction in the conduits, or the gas-producers are so arranged that the whole of the distillation products and ammonia given off at the top of the charge are led down to the bottom, so as to pass up through the incandescent zone of the producer in order to be converted into permanent gases, by which arrangement nearly the whole of the ammonia produced is decomposed and lost.

By means of my present improved construction I obtain the advantage that while the volatile gases produced by distillation are effectually converted into permanent gases nearly the whole of the ammonia produced is taken off without becoming decomposed.

The essential feature of the new construction consists in that the upper part of the producer-chamber is divided by partition-walls, that penetrate down to a certain extent into the charge of fuel, into three compartments, of which the middle one is filled with checker-work or loosely-piled materials, such as bars of iron or fire-brick, and communicates at the top with the discharge-flue for carrying off the producer-gases. The two side compartments have at the top the hoppers for feeding in the fuel, and they are provided with side openings from which pipes or flues lead down to a central chamber near the bottom of the producer opposite the inlets for the forced air-supply. In the pipes or flues are steam-injectors, by means of which a certain quantity of the gases distilled off at the top of the producer are drawn off and propelled down into the said central chamber, whence they issue through openings and rise up through the incandescent fuel, together with the ordinary producer-gases, and pass with these as permanent gases up through the before-mentioned central compartment filled with checker-work. Instead of injectors fans might obviously be employed to force the gases and vapors. The above-mentioned injectors also have the effect of accelerating the distilling process, as they draw a certain portion of the hot producer-gases through the freshly-introduced fuel, thus imparting their heat thereto. The remainder of the gases or vapors and ammonia given off by distillation in the two side compartments and which are not drawn off by the injectors are drawn by the draft of the flue of the central compartment past the partition-walls into the central compartment, and as the checker-work of this becomes heated to from 500° to 600° centigrade the vapors become converted in great measure into permanent gases by this heat, which is, however, not sufficient to cause the decomposition of the ammonia which passes off with the gases.

I will now more particularly describe the construction of the producer for carrying out the above-described operations, referring to the accompanying drawings, in which—

Figure 1 shows a vertical longitudinal section through the producer, while Fig. 2 shows on the left side a transverse section on line X X of Fig. 1 and on the right side a transverse section on line Y Y.

This gas-producer is preferably square or rectangular in plan, two opposite side walls $a\ a$ being perpendicular and extending without any openings down to the ground and the other two opposite walls $b\ b$ sloping toward each other at the lower part of the producer. The air-supply under pressure is introduced at $c\ c$, and the ashes are removed at $e\ e$. The openings through the sides $b\ b$ are closed at the bottom by a water seal at $d$ of sufficient depth to counterbalance the pressure under which the air is forced in at $c\ c$. The ashes are taken out from underneath the water, and the producer may be provided with a step-down fire-grate, as at $f$, when the fuel employed gives very fine ashes, or with any other convenient fire-grate; but I prefer not to have any fire-grate at all, but simply to let the ashes assume the natural slope of repose which forms the zone of first contact with the blast, as shown at $y$.

The upper part of the producer is divided into the three compartments $h\ h\ i$ by two walls $g\ g$, supported on arches $t$, extending a certain distance down into the producer, as shown. The gas is taken out of the producer through the middle compartment $i$ and flue-pipe $s$. The fuel is fed by hoppers $j\ j$ into the two outside compartments $h\ h$ and is kept a few feet above the lower edges of the walls $g$. I provide an opening at $k$ in each of these outside compartments above the level of the fuel, and I connect these openings by means of a channel or pipe $l$ with a horizontal chamber $m$, placed in the center of the lower part of the producer and at right angles to the perpendicular walls $a$ of the producer, which chamber is provided with openings $w\ w$ in the middle of the producer. This chamber can be made of fire-clay in the shape of a retort or built of fire-bricks or any other suitable material and may be covered at the top by a V-shaped hood $o$, which prevents the openings $m'$ from being choked up or filled by the fuel and ashes outside. In each of the pipes or conduits $l$, leading from the top compartments to the bottom chamber, I insert an injector $z$, by means of which currents of the hot gas generated in the producer are drawn through the raw fuel contained in the two compartments and pass along with a portion of the products of distillation out of the top of the compartments $h$ and are forced into the bottom chamber $m$, whence they escape through the openings $w$ below the hood $o$ and pass through the hot fuel in the body of the producer. The chamber $m$ is provided at one end with a door $p$, so that the chamber can be cleaned from the outside of the producer without interrupting its regular working. In this way the distillation of the raw fuel in the two outside compartments is very quickly and effectively carried out, because the hot producer-gases drawn by the injectors and brought into direct and intimate contact with the raw fuel supply the heat necessary for this distillation. In the case of fuels containing large quantities of moisture or combined water this water is readily carried off as vapor, together with the products of distillation, and passes through the incandescent zone in the center of the producer, thus effecting a considerable saving in steam that would otherwise have to be provided from external sources for the production of gas and for the recovery of ammonia.

Another great advantage of the distillation of the fuel before it descends into the body of the producer is that this fuel is not liable to coke together and form in large masses, which have hitherto prevented some fuels containing large amounts of bituminous matters from being used in ordinary producers. If, however, the distillation of the fuel is carried to completeness in the compartments $h\ h$, into which the raw fuel is fed, and if the whole products of distillation so obtained are forced into the very hot zone in the center of the producer, the greater part of the ammonia contained in these products of distillation is dissociated and destroyed. In order to avoid this loss of ammonia, I carry the distillation in the feeding-chambers of the producer only to such a point as to drive off all the water and a certain portion of the bituminous matter, and in order to convert the rest of the bituminous matter into permanent gases I fill the center compartment $i$ between the two walls a little distance above the incandescent fuel with a checkered pile of brick or metal bars or the like, as shown at $q$, which may rest on shoulders formed in the wall or may be supported in any other convenient way. This checker-work becomes heated from 500° to 700° centigrade by the hot producer-gases passing through it and the gas distilled from the fuel below the walls $g$, containing tarry matters and ammonia, becoming heated to the temperature mentioned in passing through the checker-work $q$. The tarry matters in these gases are to a very great extent converted into permanent gases, and the remainder becomes changed into an easily-condensable tar. If this center compartment between the two arches is not of sufficient capacity to effect my purpose to the extent desired, I continue the center compartment $i$ above the top of the side compartments $h$ by carrying the brick walls forming this compartment to any desired height, as shown at $r$, and filling the chamber extended in this way with checker-work up to near its top, out of which the producer-gas is led away.

Having thus described the nature of this invention and the best means I know of carrying the same into practical effect, I claim—

A method of operating gas-producers for obtaining combustible gases and ammonia from fuel which consists in blasting a bed of fuel to incandescence and distilling the fuel, drawing off a portion of the gases given off during distillation, forcing the said drawn-off gases upwardly through the incandescent fuel, converting said gases thereby into permanent gases, and then forcing the said permanent gases with the remainder of the gases given off during distillation through a chamber heated to a temperature sufficient to convert the said remaining gases given off into permanent gases without decomposing the ammonia present.

In testimony whereof I have hereunto set my hand in presence of two subscribing witnesses.

LUDWIG MOND.

Witnesses:
ALBERTO CERATOLI,
A. E. DAVIES.